Aug. 9, 1932.  C. COLES  1,870,604
FOOTBALL, BASKET BALL, AND THE LIKE
Filed Nov. 10, 1930
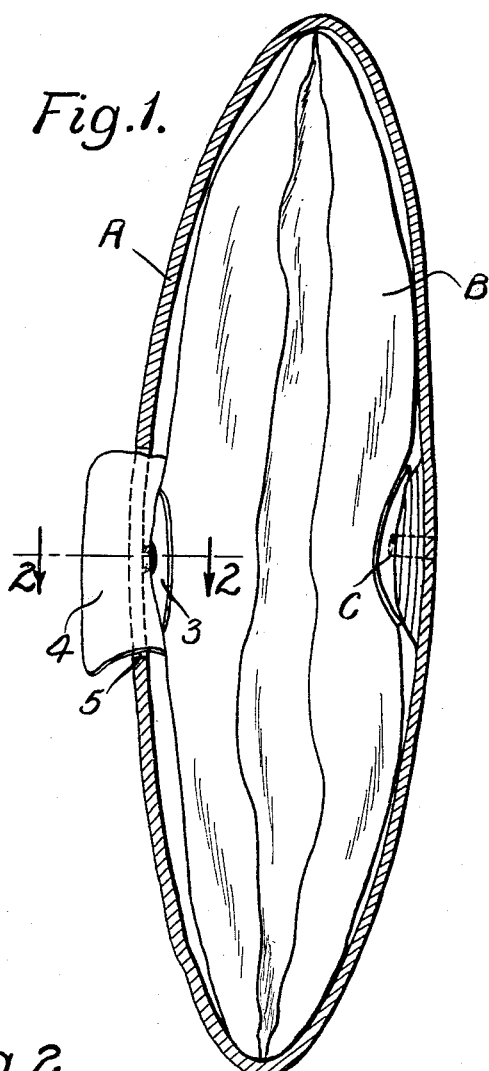
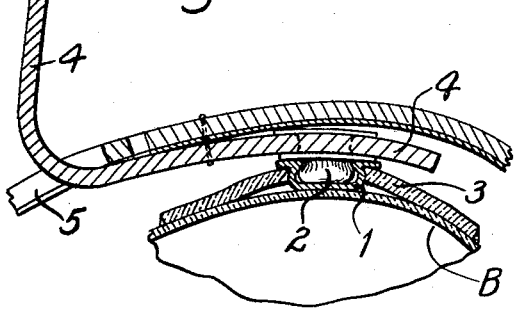
Inventor:
Clarence Coles
By Bakewell & Church
Attorneys Patented Aug. 9, 1932

1,870,604

UNITED STATES PATENT OFFICE

CLARENCE COLES, OF ST. LOUIS, MISSOURI, ASSIGNOR TO RAWLINGS MANUFACTURING COMPANY, OF ST. LOUIS, MISSOURI, A CORPORATION OF MISSOURI

FOOTBALL, BASKET BALL AND THE LIKE

Application filed November 10, 1930. Serial No. 494,650.

This invention relates to footballs, basket balls and similar articles that consist of an inflatable bladder surrounded by an outer casing constructed usually of leather, and particularly balls of the type that are equipped with an inflating device, such, for example, as a metallic valve stem, connected to the bladder and to the casing in such a way that if the bladder becomes deflated the inflating device will not drop downwardly into the casing or move out of alignment with the hole in the casing that is intended to receive the nozzle of an air pump used to inflate the bladder.

In manufacturing balls of the particular type mentioned it is the usual practice to inflate the bladder before the ball leaves the factory where it is made so as to test the ball for leaks and defects in workmanship. After the ball has been tested the air is expelled from the bladder and the ball is then packed for shipment in a collapsed condition. While the bladder is being deflated or when the bladder is in a partly deflated condition, it is possible for the bladder to shift, twist or turn relatively to the casing, due to the fact that the bladder is connected to the casing at only one point, i. e., where the inflating device is located. If this occurs there is great danger of straining the connection or joint between the rubber bladder and the metallic valve stem or other inflating device, and there is also danger of a "hard spot" being created in the ball by reason of the bladder not bearing uniformly throughout its entire area on the interior of the casing.

My invention has for its main object to eliminate or overcome this inherent defect or objection of balls of the particular type mentioned. To this end I have devised a ball that is provided with means for attaching the bladder to the casing at a point remote from the place where the valve stem or other inflating device connects the bladder to the casing, thereby maintaining the bladder in such relationship with the casing when the bladder is in a deflated or partly deflated condition, that when the bladder is subsequently inflated it will bear uniformly throughout its entire area on the inner side of the casing, and no undue strain will be exerted on the joint or connection between the bladder and the inflating device. The particular location and the particular type, style or kind of means that is used to prevent the bladder from shifting into an incorrect position relatively to the casing are immaterial, but I prefer to employ a bladder holding means of such construction that the bladder can be easily removed from or installed in the casing, and locate said means substantally diametrically opposite the point where the bladder is attached to the casing by means of the inflating device so as to insure that the longitudinal axis of the bladder will extend parallel to the longitudinal axis of the casing when the bladder is inflated.

Figure 1 of the drawing is a view partly in section, illustrating my improved ball, the bladder being shown in a collapsed condition; and Figure 2 is an enlarged sectional view, illustrating one type of means that I have found to be most satisfactory for holding the bladder against shifting, twisting or turning relatively to the casing of the ball.

In the drawing, A designates the outer casing of a football, basket ball or the like, and B designates an inflatable bladder arranged inside of the casing A and provided with an inflating device which is herein illustrated as consisting of a metallic valve stem C connected to the bladder and to the casing A in such a manner that the terminal portion of said valve stem will be maintained in longitudinal alignment with a hole in the casing through which the nozzle of an air pump can be inserted to attach the pump to the valve stem in the operation of inflating the bladder or increasing the pressure of same. The ball may be equipped with any preferred type or kind of inflating device and said inflating device may be connected in any suitable way to the casing and to the bladder. For example, the inflating device may be carried by the bladder and detachably connected to the casing, or the inflating device may be carried by the casing and detachably connected to the bladder.

In order to eliminate the possibility of the bladder shifting, twisting or turning relatively to the casing when the bladder is deflated or partly deflated, and thus assuming an incorrect position relatively to the casing when the bladder is subsequently inflated, I have equipped the ball with a means for attaching the bladder to the casing at a point remote from the inflating device C. In the preferred form of my invention herein illustrated the means just referred to is located substantially diametrically opposite the inflating device C, and said means is of such construction that the bladder can be easily installed in or removed from the casing A. One means that I have found to be very satisfactory for holding the bladder against accidental shifting or twisting consists of a conventional glove fastener composed of a socket piece 1 and a co-acting button piece 2 that can be easily forced into or withdrawn from said socket piece. The socket piece 1 of the fastener is herein illustrated as being carried by a supporting member 3 that is vulcanized or permanently connected in any other suitable manner to the exterior of the bladder B, and the button piece 2 of the fastener is herein illustrated as being carried by a flap 4 arranged on the inside of the casing A and permanently attached to the casing at one side of the slit or opening 5 in the casing through which the bladder is inserted in and removed from the casing. This method of attaching the bladder to the casing is inexpensive to produce, as the flap 4 is the conventional flap used in ball casings to serve as a closure for the laced slit or opening in the casing, and it has the added advantage of enabling the bladder to be easily installed in or removed from the casing. As previously stated, however, I wish it to be understood that my invention is not limited to the use of any particular style, kind or type of holding means for the bladder, and that the point of connection between the bladder and casing is immaterial, as my broad idea consists of a football, basket ball or the like equipped with a means for attaching the bladder to the casing or to a part on the interior of the casing, so as to prevent or eliminate the possibility of the bladder assuming an incorrect position relatively to the casing, said means either being of the type that will detachably connect the bladder to the casing, or of the type that will permanently connect the bladder to the casing, and being located either substantially diametrically opposite the point where the inflating device attaches the bladder to the casing, or located at any other suitable or preferred point that will prevent accidental shifting or turning of the bladder.

Having thus described my invention, what I claim as new and desire to secure by Letters Patent is:

1. A ball composed of an inflatable bladder and a casing surrounding the bladder, an inflating device for the bladder attached to the bladder and casing and accessible from the exterior of the casing, and a separate means for connecting the bladder to the casing at a point remote from said inflating device.

2. A ball composed of an inflatable bladder and a casing surrounding the bladder, an inflating device for the bladder attached to the bladder and casing and accessible from the exterior of the casing, and a means for connecting the bladder to the casing at a point substantially diametrically opposite said inflating device.

3. A ball composed of an inflatable bladder and a casing surrounding the bladder, an inflating device for the bladder attached to the bladder and casing and accessible from the exterior of the casing, and a means for detachably connecting the bladder to the casing at a point remote from said inflating device.

4. A ball composed of an inflatable bladder and a casing surrounding the bladder, an inflating device for the bladder attached to the bladder and casing and accessible from the exterior of the casing, and a means for detachably connecting the bladder to the casing at a point substantially diametrically opposite said inflating device.

5. A ball composed of an inflatable bladder and a casing surrounding the bladder, an inflating device for the bladder attached to the bladder and casing and accessible from the exterior of the casing, and connection between the bladder and the casing separate and distinct from said inflating device and adapted to co-act with the same to cause the longitudinal axis of the bladder to extend parallel to the longitudinal axis of the casing when the bladder is inflated.

6. A ball composed of an inflatable bladder and a casing surrounding the bladder, an inflating device for the bladder attached to the bladder and casing and accessible from the exterior of the casing, a flap on the interior of the casing, and a means separate and distinct from said inflating device for attaching the bladder to said flap.

7. A ball composed of an inflatable bladder and a casing surrounding the bladder, an inflating device for the bladder attached to the bladder and casing and accessible from the exterior of the casing, the casing having an opening through which the bladder can be inserted and removed, and a means accessible through said opening for connecting the bladder to the casing at a point remote from said inflating device.

8. A ball composed of an inflatable bladder and a casing surrounding the bladder, an inflating device for the bladder attached to the bladder and casing and accessible from the exterior of the casing, the casing having an opening through which the bladder can be inserted and removed, a flap attached to the casing so as to serve as a closure for said opening, and a means separate and distinct from said inflating device for connecting the bladder to said flap.

9. A ball composed of an inflatable bladder and a casing sourrounding the bladder, an inflating device for the bladder attached to the bladder and casing and accessible from the exterior of the casing, and co-acting devices on the exterior of the bladder and on the interior of the casing for detachably connecting the bladder to the casing at a point remote from said inflating device.

10. A ball composed of an inflatable bladder and a casing surrounding the bladder, an inflating device for the bladder attached to the bladder and casing and accessible from the exterior of the casing, a flap on the interior of the casing, and a device for detachably connecting the bladder to said flap composed of an element on the exterior of the bladder, and a co-acting element carried by said flap.

11. A ball composed of an inflatable bladder and a casing surrounding the bladder, an inflating device for the bladder attached to the bladder and casing and accessible from the exterior of the casing, the casing having an opening through which the bladder can be inserted and removed, a flap on the interior of the casing adapted to serve as a closure for said opening, and a device for detachably connecting the bladder to the casing at a point remote from said inflating device, composed of an element carried by said flap, and a co-acting element carried by a member vulcanized to the exterior of the bladder.

12. A ball, comprising a casing, an inflatable bladder arranged inside of the casing, and opposed connections between the casing and bladder disposed so as to cause the longitudinal axis of the bladder to extend parallel to the longitudinal axis of the casing when the bladder is inflated.

CLARENCE COLES.